United States Patent
You (10) Patent No.: US 11,079,903 B2
(45) Date of Patent: Aug. 3, 2021

(54) METHOD AND SYSTEM FOR QUICK SELECTION BY INTELLIGENT TERMINAL, AND INTELLIGENT TERMINAL

(71) Applicant: HUIZHOU TCL MOBILE COMMUNICATION CO., LTD., HuiZhou (CN)

(72) Inventor: Kai You, HuiZhou (CN)

(73) Assignee: .HUIZHOU TCL MOBILE COMMUNICATION CO., LTD, Huzhou (CN)

( * ) Notice: Subject to any disclaimer, the term of this patent is extended or adjusted under 35 U.S.C. 154(b) by 0 days.

(21) Appl. No.: 16/461,378

(22) PCT Filed: Oct. 24, 2017

(86) PCT No.: PCT/CN2017/107531
§ 371 (c)(1),
(2) Date: May 16, 2019

(87) PCT Pub. No.: WO2018/090796
PCT Pub. Date: May 24, 2018

(65) Prior Publication Data
US 2019/0286289 A1   Sep. 19, 2019

(30) Foreign Application Priority Data
Nov. 16, 2016   (CN) .......................... 201611008693.4

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 3/04883* (2013.01)

(58) Field of Classification Search
CPC ... G06F 3/0482; G06F 3/0488; G06F 3/04883
See application file for complete search history.

(56) References Cited

U.S. PATENT DOCUMENTS

| | | | | |
|---|---|---|---|---|
| 6,122,647 | A | * 9/2000 | Horowitz | .............. G06F 16/954 715/205 |
| 7,036,078 | B1 | * 4/2006 | Michail | ................. G06F 40/166 715/202 |

(Continued)

FOREIGN PATENT DOCUMENTS

| | | |
|---|---|---|
| CN | 103440096 A | 12/2013 |
| CN | 103513870 A | 1/2014 |
| CN | 106648332 A | 5/2017 |

*Primary Examiner* — Nicholas Augustine
(74) *Attorney, Agent, or Firm* — Soroker Agmon Nordman (57) ABSTRACT

A method and system for quick selection by an intelligent terminal, and an intelligent terminal are provided. The method includes receiving a multi-selection instruction of a user to enter a multi-selection mode, and selecting at least one entry according to the selection of the user; receiving a touch instruction of the user, and obtaining the position of a touch point; and marking all the entries between an entry where the touch point is located and the selected entry as being in a selected state. No need for carrying out a selection operation on entries one by one is realized, thereby being convenient and quick, and not being prone to errors.

11 Claims, 4 Drawing Sheets

(51) Int. Cl.
    *G06F 3/0488*     (2013.01)
    *G06F 3/01*     (2006.01)

(56) References Cited

U.S. PATENT DOCUMENTS

| | | | |
|---|---|---|---|
| 8,060,357 B2 * | 11/2011 | Segond | G06F 16/332 |
| | | | 704/1 |
| 8,352,855 B2 * | 1/2013 | Levy | G06F 40/174 |
| | | | 715/243 |
| 2001/0047351 A1 * | 11/2001 | Abe | G06F 16/313 |
| 2003/0185448 A1 * | 10/2003 | Seeger | G06K 9/2054 |
| | | | 382/229 |
| 2004/0261023 A1 * | 12/2004 | Bier | G06F 40/186 |
| | | | 715/239 |
| 2004/0261059 A1 * | 12/2004 | Spencer | G06F 8/36 |
| | | | 717/120 |
| 2005/0154994 A1 * | 7/2005 | Chen | G06F 9/543 |
| | | | 715/770 |
| 2007/0118794 A1 * | 5/2007 | Hollander | G06F 16/954 |
| | | | 715/205 |
| 2007/0226190 A1 * | 9/2007 | Lorenzen | G06F 16/9577 |
| 2009/0055356 A1 * | 2/2009 | Hanyu | G06F 16/90328 |
| 2009/0058820 A1 * | 3/2009 | Hinckley | G06F 3/04883 |
| | | | 345/173 |
| 2009/0193337 A1 * | 7/2009 | Carter | G06F 3/0481 |
| | | | 715/277 |
| 2010/0278453 A1 * | 11/2010 | King | G06F 40/169 |
| | | | 382/321 |
| 2012/0023102 A1 * | 1/2012 | Venkataraman | G06F 16/954 |
| | | | 707/737 |
| 2015/0121298 A1 | 4/2015 | Ma | |
| 2016/0292264 A1 * | 10/2016 | Hoshino | G06F 3/0485 |

\* cited by examiner

METHOD AND SYSTEM FOR QUICK SELECTION BY INTELLIGENT TERMINAL, AND INTELLIGENT TERMINAL

CROSS REFERENCE TO RELATED APPLICATION

This application claims the priority of International Application No. PCT/CN2017107531, filed Oct. 24, 2017, titled "METHOD AND SYSTEM FOR QUICK SELECTION BY INTELLIGENT TERMINAL, AND INTELLIGENT TERMINAL", which claims priority to Chinese Application NO. 201611008693.4, filled on Nov. 16, 2016. The entire disclosures of each of the applications are incorporated herein by reference.

BACKGROUND

1. Technical Field

The present invention relates to intelligent terminal application technologies, and more particularly, to a method and system for quick selection by an intelligent terminal, and an intelligent terminal.

2. Description of Related Arts

Nowadays, as intelligent terminals are increasingly equipped with abundant functions, applications include more and more entries allowed to be selected. However, in the existing arts, selecting operations are realized by a long pressing operation applied to required entries. When the number of entries needed to be selected by a user is large or a purposeful selection of multiple entries needs to be made, it requires the long pressing operation to be performed one by one and this is very inconvenient. In addition, in the existing arts, all of the entries can be selected or deselected by one key. However, when the user needs to deselect the selected entries purposefully, the entries can only be deselected one by one through many times of repeated operations. These processes are not only complicated but also easily to cause mis-operations.

Therefore, there is a need to further develop and improve the existing skills.

SUMMARY

Embodiments of the present invention provide a method and system for quick selection by an intelligent terminal, and an intelligent terminal, for solving the problems in the existing arts that entries of a list in the intelligent terminal cannot be selected quickly and purposefully and a selection of multiple entries cannot be realized.

In a first aspect, an embodiment of the present invention provides an intelligent terminal, including a processor and a memory, the memory configured to store instructions and data, the processor configured to execute the steps of:

by the intelligent terminal, receiving a user multi-selection instruction to enter a multi-selection mode and simultaneously selecting at least one entry according to user selection, wherein the selected entry serves as a first boundary of a range in selection of a plurality of entries;

by the intelligent terminal, receiving a user touch instruction and obtaining a position of a touch point, wherein the position of the touch point serves as a second boundary of the range in the selection of the plurality of entries; and marking all of the entries between the entry at where the touch point is located and the selected entry as being in a selected state, the marking step including marking all of the entries between the first boundary and the second boundary as being in the selected state, wherein the entry at where the first boundary is located and the entry at where the second boundary is located are included.

Further, when the entries selected by a user involve multiple entries, the step of marking all of the entries between the entry at where the touch point is located and the selected entry as being in the selected state includes:

serving one of the entries selected by the user and located closest to the position of the touch point as a target entry and marking all of the entries between the entry at where the touch point is located and the target entry as being in the selected state.

Further, when the entries selected by the user and located closest to the position of the touch point involve two entries, the selected entry located ahead of the touch point serves as the target entry and all of the entries between the entry at where the touch point is located and the target entry are marked as being in the selected state.

Further, in the step of receiving the user multi-selection instruction to enter the multi-selection mode and simultaneously selecting the at least one entry according to user selection by the intelligent terminal, the multi-selection mode is entered by a long pressing operation applied to the entry and the entry with the applied long pressing operation is marked as being in the selected state.

Further, the step of marking all of the entries between the entry at where the touch point is located and the selected entry as being in the selected state includes:

by the intelligent terminal, marking all of the entries between the entry at where the touch point is located and the selected entry as being in the selected state after receiving a user confirmation instruction.

Further, the confirmation instruction is a touch instruction.

Further, when the touch instruction in the step of receiving the user touch instruction and obtaining the position of the touch point by the intelligent terminal remains in a pressed state, the step of marking all of the entries between the entry at where the touch point is located and the selected entry as being in the selected state is entered.

Further, the processor is further configured to execute the steps of:

by the intelligent terminal, receiving a user multi-selection instruction to enter a multi-selection mode and simultaneously selecting at least one entry according to user selection;

by the intelligent terminal, receiving the user touch instruction, obtaining the position of the touch point, and determining whether the position of the touch point is located at the selected entries; and marking all of the selected entries between the entry at where the touch point is located and an unselected entry as being in an unselected state when the position of the touch point is located at the selected entries.

In a second aspect, an embodiment of the present invention provides a method for quick selection by an intelligent terminal, including the steps of:

by the intelligent terminal, receiving a user multi-selection instruction to enter a multi-selection mode and simultaneously selecting at least one entry according to user selection;

by the intelligent terminal, receiving a user touch instruction and obtaining a position of a touch point; and marking all of the entries between the entry at where the touch point is located and the selected entry as being in a selected state.

Further, when the entries selected by a user involve multiple entries, the step of marking all of the entries between the entry at where the touch point is located and the selected entry as being in the selected state includes:

serving one of the entries selected by the user and located closest to the position of the touch point as a target entry and marking all of the entries between the entry at where the touch point is located and the target entry as being in the selected state.

Further, when the entries selected by the user and located closest to the position of the touch point involve two entries, the selected entry located ahead of the touch point serves as the target entry and all of the entries between the entry at where the touch point is located and the target entry are marked as being in the selected state.

Further, in the step of receiving the user multi-selection instruction to enter the multi-selection mode and simultaneously selecting the at least one entry according to user selection by the intelligent terminal, the multi-selection mode is entered by a long pressing operation applied to the entry and the entry with the applied long pressing operation is marked as being in the selected state.

Further, the step of marking all of the entries between the entry at where the touch point is located and the selected entry as being in the selected state includes:

by the intelligent terminal, marking all of the entries between the entry at where the touch point is located and the selected entry as being in the selected state after receiving a user confirmation instruction.

Further, the confirmation instruction is a touch instruction.

Further, when the touch instruction in the step of receiving the user touch instruction and obtaining the position of the touch point by the intelligent terminal remains in a pressed state, the step of marking all of the entries between the entry at where the touch point is located and the selected entry as being in the selected state is entered.

Further, the method further includes:

by the intelligent terminal, receiving a user multi-selection instruction to enter a multi-selection mode and simultaneously selecting at least one entry according to user selection;

by the intelligent terminal, receiving the user touch instruction, obtaining the position of the touch point, and determining, whether the position of the touch point is located at the selected entries; and marking all of the selected entries between the entry at where the touch point is located and an unselected entry as being in an unselected state when the position of the touch point is located at the selected entries.

Further, when the deselected entries involve multiple entries, the step of marking all of the selected entries between the entry at where the touch point is located and the deselected entry as being in the deselected state includes:

serving one of the unselected entries selected by a user and located closest to the position of the touch point as a target entry and marking all of the entries between the entry at where the touch point is located and the target entry as being in the unselected state.

Further, when the deselected entries selected by the user and located closest to the position of the touch point involve two entries, a deselected entry located ahead of the touch point serves as the target entry and all of the entries between the entry at where the touch point is located and the target entry are marked as being in the deselected state.

In a third aspect, an embodiment of the present invention provides a system for quick selection by an intelligent terminal, including:

one or more processors;

a memory; and one or more application programs, stored in the memory and configured to be executed by the processor, the one or more application programs including:

a first multi-selection mode entering module, configured to receive a user multi-selection instruction to enter a multi-selection mode and simultaneously select at least one entry according to user selection;

a first touch point position obtaining module, configured to receive a user touch instruction and obtain a position of a touch point; and a multi-selection module, configured to mark all of the entries between the entry at where the touch point is located and the selected entry as being in a selected state.

Further, the system further includes:

a second multi-selection mode entering module, configured to receive the user multi-selection instruction to enter the multi-selection mode and simultaneously select the at least one entry according to user selection;

a second touch point position obtaining module, configured to receive the user touch instruction, obtain the position of the touch point, and determine whether the position of the touch point is located at the selected entries; and a deselecting module, configured to mark all of the selected entries between the entry at where the touch point is located and an unselected entry as being in an unselected state.

Beneficial effects: in the present invention, by determining the position of the user touch point by the touch instruction and marking all of the entries between the entry at where the touch point is located and the selected entry, the method can realize a purposefully selection of multiple entries according to the user's needs. In comparison with the processes in selecting the entries one by one, the selection using the method is not only convenient and practical but also quick and flexible.

DETAILED DESCRIPTION

The present invention provides a method and system for quick selection by an intelligent terminal. To make the objectives, technical schemes, and effects of the present invention more clear and specific, the present invention is described in thither detail below. It should be understood that the specific embodiments described herein are merely for explaining the present invention and the present invention is not limited thereto.

Figure 1:
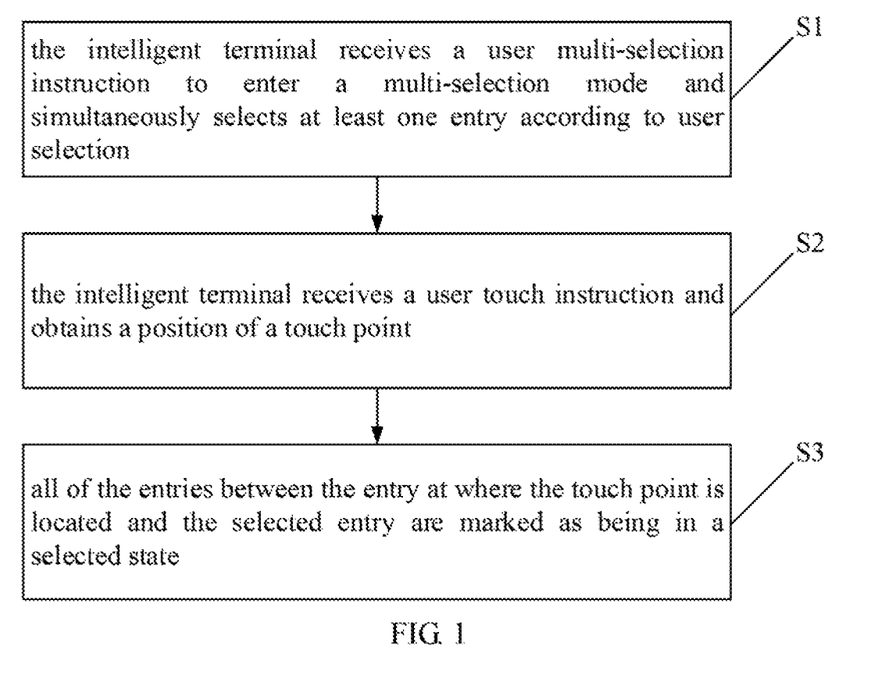
FIG. 1 is a flowchart of a method for quick selection by an intelligent terminal according to a first embodiment of the present invention.

FIG. 1 is a flowchart of a method for quick selection by an intelligent terminal according to a first embodiment. As shown in FIG. 1, the method includes the following steps.

In Step S1, the intelligent terminal receives a user multi-selection instruction to enter a multi-selection mode and simultaneously selects at least one entry according to user selection.

In Step S2, the intelligent terminal receives a user touch instruction and obtains a position of a touch point.

In Step S3, all of the entries between the entry at where the touch point is located and the selected entry are marked as being in a selected state.

In the present embodiment, the intelligent terminal selects the at least one entry in the multi-selection mode, according to the user selection. The selected entry can serve as a first boundary of a range in selection of a plurality of entries. The touch instruction is given by a user and makes the intelligent terminal obtain the position of the touch point, thereby determining a second boundary of the range in the selection of the plurality of entries. After the two boundaries are determined, all of the entries between the first boundary and the second boundary (including the entry at where the first boundary is located and the entry at where the second boundary is located) are selected. Accordingly, the present invention allows the user to realize a purposeful selection of the plurality of entries without a need to long press the selected entries one by one, thereby being convenient and quick.

Further, when the entries selected by the user in Step S1 involve multiple entries, one of the selected entries selected by the user and located closest to the position of the touch point serves as a target entry and all of the entries between the entry at where the touch point is located and the target entry are marked as being in the selected state. That is, when there are multiple first boundaries, the intelligent terminal compares the distances between the second boundary and each of the first boundaries in the multi-selection mode. One of the first boundaries located closest to the second boundary serves as a target boundary. After the two boundaries are determined, all of the entries between the second boundary and the target boundary are selected. This makes the user still able to carry out the selection of the plurality of entries after multiple entries have been selected in the multi-selection mode, thereby effectively preventing mis-operations from affecting a result of the selection. That is, some wrong operations from the user will not cause the function to be inexecutable, thereby making the method more intelligent and humanized.

Further, when the entries selected by the user and located closest to the position of the touch point involve two entries, the selected entry located ahead of the touch point serves as the target entry and all of the entries between the entry at where the touch point is located and the target entry are marked as being in the selected state. That is, when there are two first boundaries located closest to the second boundary in comparing the distances between the entry corresponding to the second boundary and each of the target entries, i.e., the two first boundaries are located at a front side and a back side of the second boundary respectively and the distances to the second boundary are the same, the first boundary located ahead of the entry corresponding to the second boundary is treated as the target boundary. For a list consisting of entries arranged from top to bottom, the entry located ahead of the second boundary refers to an entry located above the second boundary. For a list consisting of entries arranged from left to right, the entry located ahead of the second boundary refers to an entry located at a left side of the second boundary. For a list consisting of entries arranged from top to bottom and from left to right, the entry located ahead of the second boundary refers to an entry located at the top left of the second boundary.

In above processes, the user enters the multi-selection mode of the intelligent terminal by a long pressing operation applied to an entry and the entry with the applied long pressing operation is marked as being in the selected state (i.e., the selected entry serves as the first boundary). The long pressing operation indicates that the user presses a certain entry and the time the user keeps pressing exceeds a predetermined period, for example, two seconds. The entry at where the second boundary is located is determined by the user touch instruction. The touch instruction includes a first touch instruction and a second touch instruction. A touch position corresponding to the first touch instruction directs to any entry of the list. A touch position corresponding to the second touch instruction directs to any position of a screen of the intelligent terminal. Generally speaking, during the practical operations, the user may click a certain entry to carry out transmission of the first touch instruction, and then the user may make a further click on any position of the screen of the intelligent terminal to carry out transmission of the second touch instruction. Each of the touch instructions includes a down pressing operation and a releasing operation. When the down pressing operation remains at a position of a certain entry for the first touch instruction, the intelligent terminal determines a position corresponding to the first touch instruction by detecting the down pressing operation of the second touch instruction, and marks the position as the second boundary. The down pressing operation for a second touch point is usually a short pressing operation, that is, pressing down and immediately releasing. As can be seen, the method marks the down pressing operation corresponding to the second touch point to confirm the position of the second boundary. This is beneficial for the intelligent terminal to execute the user instructions accurately, thereby efficiently determining a range of the selected entries, being more accurate for the operations, effectively avoiding mistakes, and improving efficiency in selection of the entries.

Figure 2:
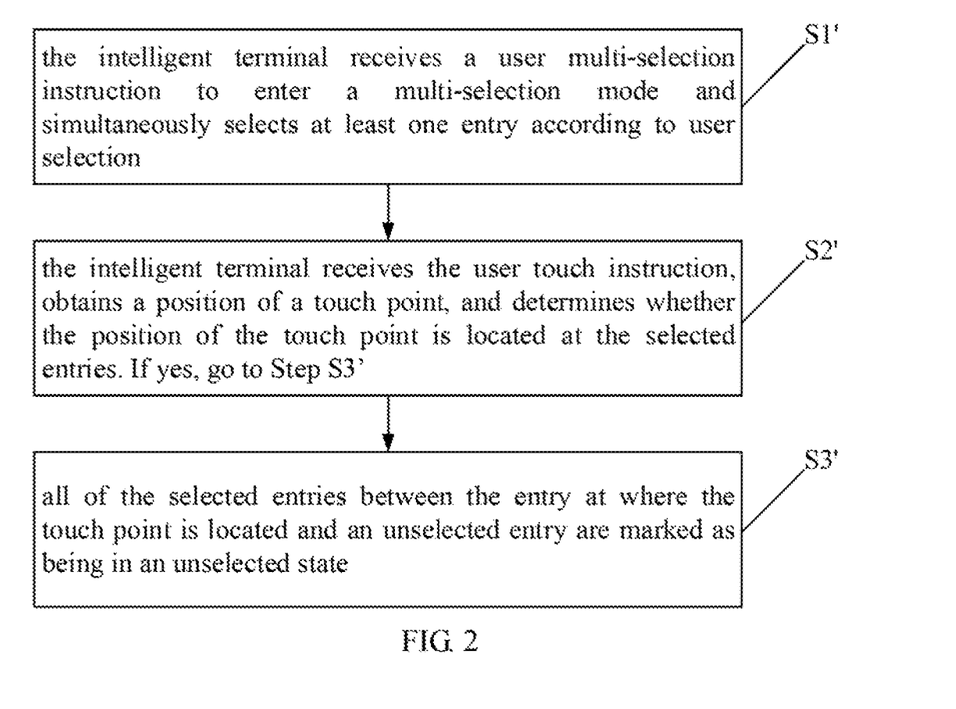
FIG. 2 is a flowchart of a method for quick selection by an intelligent terminal according to a second embodiment of the present invention.

The present invention provides a second embodiment of a method for quick selection by the intelligent terminal. As shown in FIG. 2, the method includes the following steps.

In Step S1, the intelligent terminal receives a user multi-selection instruction to enter a multi-selection mode and simultaneously selects at least one entry according to user selection.

In Step S2', the intelligent terminal receives the user touch instruction, obtains a position of a touch point, and determines whether the position of the touch point is located at the selected entries. If yes, go to Step S3'.

In Step S3', all of the selected entries between the entry at where the touch point is located and an unselected entry are marked as being in an unselected state.

In the present embodiment, the intelligent terminal receives the user multi-selection instruction to enter the multi-selection mode and selects the at least one entry according to the user selection, the intelligent terminal receives the user touch instruction of the user, obtains the position of the touch point. When the touch point is located at any one of the selected entries, all the selected entries between the entry at where the touch point is located and an unselected entry as being in an unselected state. That is, when the touch point is located at any of the pre-selected entries, a deselecting operation is executed to cancel the selection, and the objects to be deselected are marked and determined by marking all the entries between the entry at where the touch point is located and the unselected entry (including the entry at where the touch point is located) as being in the unselected state.

Further, when the unselected entries involve multiple entries, one of the unselected entries selected by the user and located closest to the position of the touch point serves as a target entry and all of the entries between the entry at where the touch point is located and the target entry are marked as being in the unselected state.

Further, when the unselected entries selected by the user and located closest to the position of the touch point involve two entries, i.e., the two unselected entries are located at a front side and a back side of the entry at where the touch point is located, respectively, and the distances to the entry at where the touch point is located are the same, the unselected entry located ahead of the touch point serves as the target entry and all of the entries between the entry at where the touch point is located and the target entry are marked as being in the unselected state.

This process relates to a deselecting operation in contrast to the selecting operation in the afore-described processes. Details of this method is as the same as the foregoing technical scheme, and are not repeated since they have been described in details in the foregoing selecting processes.

Above context carries out a quick selection from the entries based on distance comparison. Different criteria for the comparison may be further provided to the user herein to realize a purposeful quick selection from the entries and a selection of multiple entries. For example, the user marks all the entries located ahead or behind the selected entries as being in the selected state. For the entries arranged as icons, the user may restrict the icons able to be selected and marked to be the icons in the columns as the same as the selected icons, for example, the icons located above or below the selected icons. Alternatively, the user may restrict the icons able to be selected and marked to be the icons in the rows as the same as the selected icons, for example, the icons located a left side or a right side of the selected icons. In summary, the user may set criteria for the comparison for the objects able to be selected, according to needs, thereby effectively realizing purposeful quick selection from the entries.

Figure 3:
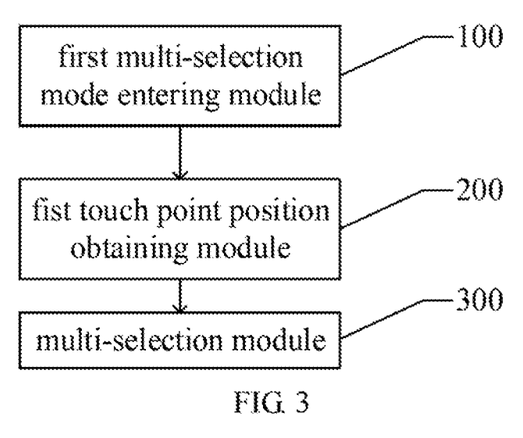
FIG. 3 is a structural block diagram showing a system for quick selection by an intelligent terminal according to a first embodiment of the present invention.

Based on the afore-described method, the present invention further provides a system for quick selection by an intelligent terminal according to a first embodiment. As shown in FIG. 3, the system includes the followings.

A first multi-selection mode entering module 100 is configured to receive a user multi-selection instruction to enter a multi-selection mode and simultaneously select at least one entry according to user selection.

A first touch point position obtaining module 200 is configured to receive a user touch instruction and obtain a position of a touch point.

A multi-selection module 300 is configured to mark all of the entries between the entry at where the touch point is located and the selected entry as being in a selected state.

In the present embodiment, by the first multi-selection mode entering module 100, the first touch point position obtaining module 200, and the multi-selection module 300, processes of a selective selection from the entries in a list in the intelligent terminal are accomplished. This system is simple in structure, redundant operations are avoided, and it is beneficial in improving response speed during the selecting processes. The advantages of practical processes of the system have been described in detail in the afore-described method, and are not repeated herein.

Figure 4:
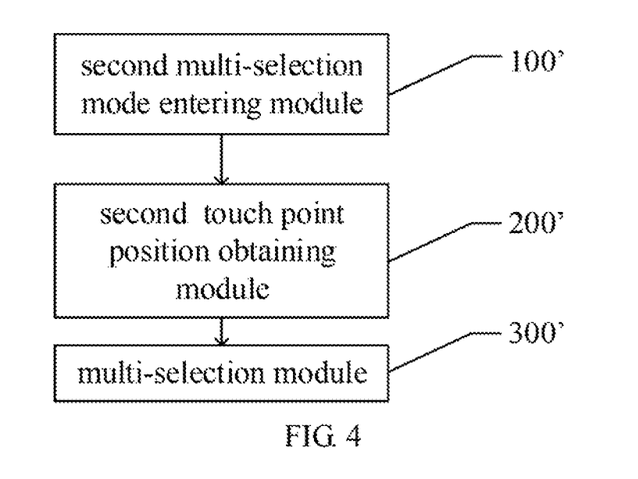
FIG. 4 is a structural block diagram showing a system for quick selection by an intelligent terminal according to a second embodiment of the present invention.

Based on the afore-described method, the present invention further provides a system for quick selection by an intelligent terminal according to a second embodiment. As shown in FIG. 4, the system includes the followings.

A second multi-selection mode entering module 100' is configured to receive a user multi-selection instruction to enter a multi-selection mode and simultaneously select at least one entry according to user selection.

A second touch point position obtaining module 200' is configured to receive the user touch instruction, obtain a position of a touch point, and determine whether the position of the touch point is located at the selected entries. If yes, a deselecting module is executed.

The deselecting module 300' is configured to mark all of the selected entries between the entry at where the touch point is located and an unselected entry as being in an unselected state.

In the present embodiment, by the second multi-selection mode entering module 100', the second touch point position obtaining module 200', and the deselecting module 300', processes of a selective deselection from the entries in a list in the intelligent terminal are accomplished. The advantages of practical processes of the system have been described in detail in above context, and are not repeated herein.

Above all, the intelligent terminal receives a user multi-selection instruction to enter a multi-selection mode and simultaneously selects at least one entry according to user selection, the intelligent terminal receives a user touch instruction and obtains a position of a touch point, and all of the entries between the entry at where the touch point is located and the selected entry are marked as being in a selected state. By this way, the present invention realizes a quick and, selective selection from the entries of a list in the intelligent terminal and a selection of multiple entries. The method carries out not only a selection but also a deselection. The method is simple, has high efficiency in selection, and is beneficial in applying and widely spreading the purposeful quick selection for the intelligent terminal.

Embodiments of the present invention further provides a storage media storing a computer program, which enable a computer to execute the afore-described method for quick selection by the intelligent terminal.

It is noted that a person of ordinary skill in the art can realize that part or whole of the steps in the methods according to above embodiments may be implemented by a program instructing relevant hardware. The program may be stored in a computer readable storage media. The storage media may include a Read-Only Memory (ROM), a Random Access Memory (RAM), a magnetic disk, or an optical disk.

Figure 5:
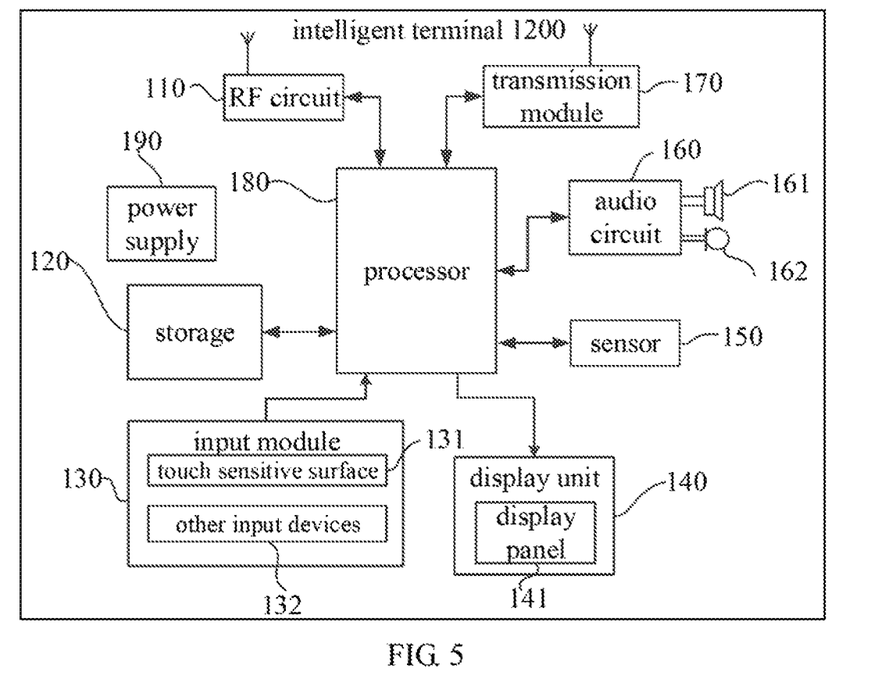
FIG. 5 is a schematic structural diagram showing an intelligent terminal provided in accordance with an embodiment of the present disclosure.

FIG. 5 is a structural block diagram showing an intelligent terminal provided in an embodiment of the present invention. The intelligent terminal can be utilized to implement the method and system for quick selection by the intelligent terminal according to above embodiments. The intelligent terminal 1200 can be a smartphone or a tablet computer.

As shown in FIG. 5, the intelligent terminal 1200 may include a radio frequency (RF) circuit 110, a storage 120 including of one or more computer-readable storage media (a single one is merely illustrated in the drawings), an input module 130, a display unit 140, a sensor 150, an audio circuit 160, a transmission module 170, a processor 180 including one or more processing cores (a single one is merely illustrated in the drawings), a power supply 190, and etc. A person skilled in the art understands that the structure of the intelligent terminal 1200 shown in FIG. 5 does not constitute a limitation to the intelligent terminal 1200, and may include more or less components than those illustrated in the drawings. Furthermore, some components of the intelligent terminal 1200 can be combined and/or arranged in different ways other than that shown in FIG. 5.

The RF circuit 110 is configured to receive and transmit electromagnetic waves to implement conversion between the electromagnetic waves and electrical signals, thereby communicating with a communication network or any other device. The RF circuit 110 may include various existing circuit components for executing the functions, for example, an antenna, an RF transceiver, a digital signal processor, an encryption/decryption chip a subscriber identity module (SIM) card, a storage, and so on. The RF circuit 110 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The storage 120 can be configured to store software programs and modules, such as the program instructions/modules corresponding to the method and system for quick selection by the intelligent terminal in above-mentioned embodiments. The processor 180 can perform various applications of functions and data processing by executing the software programs and modules stored in the storage 120 to implement the quick selection function for the intelligent terminal. The storage 120 may include high-speed random access memory, and may further include non-volatile memory such as one or more disk storage devices, a flash memory, or other non-volatile solid state storage. In some embodiments, the storage 120 also includes a remote storage disposed corresponding to the processor 180. The remote storage may be linked to the intelligent terminal 1200 via a network. The network may include but not limited to at least one combination of internet, an intranet, a local area network, and a mobile communication network.

The input unit 130 can be configured to receive input numbers or character information, and generate signal input of a keyboard, a mouse, a joystick, or an optical trackball in relation to user settings and functional control. Specifically, the input unit 130 may include a touch sensitive surface 131 and any other input device 132. The touch sensitive surface 131, which is also called a touch screen or a touchpad, can gather a touch operation (for example, operations by use of a finger of a user, a stylus, and any other suitable object or attachment on or near the sensitive surface 131) applied on or near to the touch sensitive surface 131 by the user and drive a connected device according to preset programs. Optionally, the touch sensitive surface 131 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 180, and further receives and executes an instruction from the processor 180. Furthermore, the touch sensitive surface 131 may be implemented by utilizing capacitive, resistive, infrared, and surface acoustic wave technologies. In addition to the touch sensitive surface 131, the input unit 130 may further include any other input device 132. Specifically, the input device may include but not limited to one or any of the combination of a physical keyboard, function keys (such as volume control keys, switch keys, etc.), a trackball, a mouse, and a joystick.

The display unit 140 may be configured to display information inputted by the user, information provided for the user, or various types of graphical user interfaces of the intelligent terminal 1200. The graphical user interfaces may include a graph, a text, an icon, a video, and any combination of them. The display unit 140 may include a display panel 141, optionally, which may be a liquid crystal display (LCD) or an Organic Light-Emitting Diode (OLED) display. Furthermore, the touch sensitive surface 131 may cover the display panel 141. When the touch sensitive surface 131 detects a touch operation on or near the touch sensitive surface 131 and transmits a corresponding signal to the processor 180 to determine a type of the touch event, the processor 180 controls the display panel 141 to provide appropriate visual output according to the type of the touch event. Although the touch sensitive surface 131 and the display panel 141 in FIG. 5 are two separate components for implementing input and output functions, the touch sensitive surface 131 and the display panel 141 may be integrated into one component for implementing the input and output functions in some embodiments.

The intelligent terminal 1200 may further include at least one sensor 150, such as a light sensor, a motion sensor, and other sensors. Specifically, the light sensor can include an ambient light sensor and a proximity sensor. The ambient light sensor can adjust the brightness of the display panel 141 according to bright or dark as to the ambient light. The proximity sensor can turn off the display panel 141 and/or the backlight when the intelligent terminal 1200 is moved close to ears. As one type of the motion sensor, a gravity sensor (G-sensor) can detect acceleration speed on all directions (generally up to three axis), can detect magnitude and direction of the gravity when it stays still, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the intelligent terminal 1200, and the details for these are not repeated herein.

The audio circuit 160, a speaker 161, and a microphone 162 provide an audio interface between the user and the intelligent terminal 1200. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to an electrical signal. The audio circuit 160 converts the electrical signal to audio data and transmits the audio data to the processor 180 for further processing. After the processing, the audio data may be transmitted to another terminal via the RF circuit 110, or transmitted to the storage 120 for further processing. The audio circuit 160 may further include an earphone jack for providing communication between an external earphone and the intelligent terminal 1200.

The intelligent terminal 1200 can be configured to, by the transmission module 170 (such as a WIFI module), send and receive entails, browse a webpage, and access to streaming media, and so on. It provides the user with wireless broadband interact access. It should be understood that although the transmission module 170 is illustrated in FIG. 5, this module is not an essential component for the intelligent terminal 1200 and can be omitted according to needs without departing from the scope of the present invention.

The processor 180 functions as a control center of the intelligent terminal 1200 and is configured to connect each component of the cell phone using various interfaces and circuits, and is configured to execute the various functions of the intelligent terminal 1200 and to perform data processing by running or executing the software programs and/or modules stored in the storage 120 and calling the data stored in the storage 120, thereby monitoring the overall intelligent terminal 1200. Optionally, the processor 180 can include one or more processing cores. In some embodiments, an application processor and a modulation/demodulation processor can be integrated to form the processor 180. The application processor is primarily configured to process an operating system, user interfaces, application programs, and so on. The modulation/demodulation processor is primarily configured to process wireless communication. It should be understood that the modulation/demodulation processor can be independent from the processor 180.

The intelligent terminal 1200 further includes the power supply 190 configured to provide power for the various components of the intelligent terminal 1200. In some embodiments, the power supply can be logically coupled to the processor 180 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the intelligent terminal 1200 may include a camera (such as a front camera and a rear camera), a BLUETOOTH module, and so on. They are not repeated herein. In the present embodiment, a display unit of the intelligent terminal is a display with a touch screen. The intelligent terminal further includes a storage and one or more programs. The one or more programs are stored in the storage. After configuration, one or more processors execute the one or more programs, which include the following operating instructions:

by the intelligent terminal, receiving a user multi-selection instruction to enter a multi-selection mode and simultaneously selecting at least one entry according to user selection, wherein the selected entry serves as a first boundary of a range in selection of a plurality of entries;

by the intelligent terminal, receiving a user touch instruction and obtaining a position of a touch point, wherein the position of the touch point serves as a second boundary of the range in the selection of the plurality of entries; and marking all of the entries between the entry at where the touch point is located and the selected entry as being in a selected state, the marking step including marking all of the entries between the first boundary and the second boundary as being in the selected state, wherein the entry at where the first boundary is located and the entry at where the second boundary is located are included.

When the entries selected by a user involve multiple entries, the step of marking all of the entries between the entry at where the touch point is located and the selected entry as being in the selected state includes:

serving one of the entries selected by the user and located closest to the position of the touch point as a target entry and marking all of the entries between the entry at where the touch point is located and the target entry as being in the selected state.

When the entries selected by the user and located closest to the position of the touch point involve two entries, the selected entry located ahead of the touch point serves as the target entry and all of the entries between the entry at where the touch point is located and the target entry are marked as being in the selected state.

In the step of receiving the user multi-selection instruction to enter the multi-selection mode and simultaneously selecting the at least one entry according to user selection by the intelligent terminal, the multi-selection mode is entered by a long pressing operation applied to the entry and the entry with the applied long pressing operation is marked as being in the selected state.

The step of marking all of the entries between the entry at where the touch point is located and the selected entry as being in the selected state includes:

by the intelligent terminal, marking all of the entries between the entry at where the touch point is located and the selected entry as being in the selected state after receiving a user confirmation instruction.

The confirmation instruction is a touch instruction.

When the touch instruction in the step of receiving the user touch instruction and obtaining the position of the touch point by the intelligent terminal remains in a pressed state, the step of marking all of the entries between the entry at where the touch point is located and the selected entry as being in the selected state is entered.

The processor is further configured to execute the steps of:

by the intelligent terminal, receiving, a user multi-selection instruction to enter a multi-selection mode and simultaneously selecting at least one entry according to user selection;

by the intelligent terminal, receiving the user touch instruction, obtaining the position of the touch point, and determining, whether the position of the touch point is located at the selected entries; and marking all of the selected entries between the entry at where the touch point is located and an unselected entry as being in an unselected state when the position of the touch point is located at the selected entries.

It should be understood that the application of the present invention is not limited to the above-described examples. Those of ordinary skill in the art may make modifications or variations according to the above descriptions, but all such modifications and variations should be within the appended claims.

What is claimed is:

1. An intelligent terminal, comprising:
 a processor; and
 a memory connecting to the processor, the memory configured to store instructions executable by the processor, the instructions comprising:

receiving a user multi-selection instruction to enter a multi-selection mode and simultaneously selecting one of entries in a list in response to the user multi-selection instruction;

receiving a first touch instruction and obtaining a position of a touch point corresponding to the first touch instruction;

marking all of the entries between the entry at where the touch point is located and the selected entry as being in a selected state;

in response to that multiple entries have been selected, serving one of the selected entries that is located closest to the position of the touch point as a target entry and marking all of the entries between the entry at where the touch point is located and the target entry as being in the selected state; and in response to that multiple entries have been selected, the touch point is located at any of the selected entries and multiple unselected entries are in the list, serving one of the unselected entries that is located closest to the position of the touch point as a target entry and marking all of the entries between the entry at where the touch point is located and the target entry as being in an unselected state, wherein the instructions further comprise:

receiving a second touch instruction to execute the marking steps, wherein the second touch instruction is triggered by a user touch;

determining whether the user touch corresponding to the second touch instruction is located at any position of a screen of the intelligent terminal other than location of the entries of the list; and executing the marking steps in response to the user touch corresponding to the second touch instruction located at any position of the screen of the intelligent terminal other than the location of the entries of the list, wherein a touch position corresponding to the first touch instruction directs to any entry of the list and a touch position corresponding to the second touch instruction directs to any position of the screen of the intelligent terminal.

2. The intelligent terminal according to claim 1, wherein the instructions further comprise:

in response to that multiple entries have been selected and two of the selected entries are located closest to the position of the touch point, serving one of the two selected entries that is located ahead of the touch point as the target entry and marking all of the entries between the entry at where the touch point is located and the target entry as being in the selected state.

3. The intelligent terminal according to claim 1, wherein the user multi-selection instruction is triggered by a long pressing operation applied to the one of the entries in the list, and the one of the entries in the list is marked as being in the selected state in response to entering the multi-selection mode.

4. The intelligent terminal according to claim 1, wherein the instructions further comprise:

in response to that multiple entries have been selected and the touch point is located at any of the selected entries, marking all of the selected entries between the entry at where the touch point is located and an unselected entry as being in the unselected state.

5. A method for quick selection by an intelligent terminal, comprising:

receiving a user multi-selection instruction to enter a multi-selection mode and simultaneously selecting one of entries in a list in response to the user multi-selection instruction;

receiving a first touch instruction and obtaining a position of a touch point corresponding to the first touch instruction;

marking all of the entries between the entry at where the touch point is located and the selected entry as being in a selected state;

in response to that multiple entries have been selected, serving one of the selected entries that is located closest to the position of the touch point as a target entry and marking all of the entries between the entry at where the touch point is located and the target entry as being in the selected state; and in response to that multiple entries have been selected, the touch point is located at any of the selected entries and multiple unselected entries are in the list, serving one of the unselected entries that is located closest to the position of the touch point as a target entry and marking all of the entries between the entry at where the touch point is located and the target entry as being in an unselected state, wherein the method further comprises:

receiving a second touch instruction to execute the marking steps, wherein the second touch instruction is triggered by a user touch;

determining whether the user touch corresponding to the second touch instruction is located at any position of a screen of the intelligent terminal other than location of the entries of the list; and executing the marking steps in response to the user touch corresponding to the second touch instruction located at any position of the screen of the intelligent terminal other than the location of the entries of the list, wherein a touch position corresponding to the first touch instruction directs to any entry of the list and a touch position corresponding to the second touch instruction directs to any position of the screen of the intelligent terminal.

6. The method according to claim 5, further comprising:

in response to that multiple entries have been selected and two of the selected entries are located closest to the position of the touch point, serving one of the two selected entries that is located ahead of the touch point as the target entry and marking all of the entries between the entry at where the touch point is located and the target entry as being in the selected state.

7. The method according to claim 5, wherein the user multi-selection instruction is triggered by a long pressing operation applied to the one of the entries in the list, and the one of the entries in the list is marked as being in the selected state in response to entering the multi-selection mode.

8. The method according to claim 5, further comprising:

in response to that multiple entries have been selected and the touch point is located at any of the selected entries, marking all of the selected entries between the entry at where the touch point is located and an unselected entry as being in the unselected state.

9. The method according to claim 5, further comprising:

in response to that multiple unselected entries are in the list and two of the unselected entries are located closest to the position of the touch point, serving one of the two unselected entries that is located ahead of the touch point as the target entry and marking all of the entries between the entry at where the touch point is located and the target entry as being in the unselected state.

10. A system for quick selection by an intelligent terminal, comprising:
one or more processors;
a memory; and
one or more application programs, stored in the memory and configured to be executed by the processor, the one or more application programs comprising:
receiving a user multi-selection instruction to enter a multi-selection mode and simultaneously selecting one of entries in a list in response to the user multi-selection instruction;
receiving a first touch instruction and obtain a position of a touch point corresponding to the first touch instruction;
marking all of the entries between the entry at where the touch point is located and the selected entry as being in a selected state;
in response to that multiple entries have been selected, serving one of the selected entries that is located closest to the position of the touch point as a target entry and marking all of the entries between the entry at where the touch point is located and the target entry as being in the selected state; and
in response to that multiple entries have been selected, the touch point is located at any of the selected entries and multiple unselected entries are in the list, serving one of the unselected entries that is located closest to the position of the touch point as a target entry and marking all of the entries between the entry at where the touch point is located and the target entry as being in an unselected state,
wherein the one or more application programs further comprise:
receiving a second touch instruction to execute the marking steps, wherein the second touch instruction is triggered by a user touch;
determining whether the user touch corresponding to the second touch instruction is located at any position of a screen of the intelligent terminal other than location of the entries of the list; and
executing the marking steps in response to the user touch corresponding to the second touch instruction located at any position of the screen of the intelligent terminal other than the location of the entries of the list,
wherein a touch position corresponding to the first touch instruction directs to any entry of the list and a touch position corresponding to the second touch instruction directs to any position of the screen of the intelligent terminal.

11. The system according to claim 10, wherein the one or more application programs further comprise:
in response to that multiple entries have been selected and the touch point is located at any of the selected entries, mark all of the selected entries between the entry at where the touch point is located and an unselected entry as being in the unselected state.

* * * * *